United States Patent
Mariman et al.

(10) Patent No.: US 8,267,021 B2
(45) Date of Patent: Sep. 18, 2012

(54) QUICK CLOSING TRENCH OPENER/CLOSER FOR AN AGRICULTURAL SEEDING MACHINE

(75) Inventors: Nathan Albert Mariman, Geneseo, IL (US); Elijah Beckham Garner, Bettendorf, IA (US); Lee Edward Zumdome, Bettendorf, IA (US)

(73) Assignee: Deere & Company, Moline, IL (US)

( * ) Notice: Subject to any disclaimer, the term of this patent is extended or adjusted under 35 U.S.C. 154(b) by 92 days.

(21) Appl. No.: 12/886,708

(22) Filed: Sep. 21, 2010

(65) Prior Publication Data

US 2012/0067259 A1    Mar. 22, 2012

(51) Int. Cl.
A01C 5/00 (2006.01)
A01C 9/00 (2006.01)
A01C 13/00 (2006.01)

(52) U.S. Cl. .................. 111/164; 111/193; 111/195

(58) Field of Classification Search .................. 111/164, 111/163, 157, 149, 190–196, 140, 139
See application file for complete search history.

(56) References Cited

U.S. PATENT DOCUMENTS

| | | | |
|---|---|---|---|
| 5,092,255 A | 3/1992 | Long et al. | |
| 5,375,542 A | 12/1994 | Schaffert | |
| 7,240,627 B1 * | 7/2007 | Whalen et al. | 111/140 |
| 7,438,006 B2 | 10/2008 | Mariman et al. | |
| 7,661,377 B2 | 2/2010 | Keaton et al. | |
| 2004/0134398 A1 | 7/2004 | Rylander et al. | |
| 2005/0155536 A1 | 7/2005 | Wendte et al. | |
| 2009/0025620 A1 * | 1/2009 | Keaton et al. | 111/184 |

FOREIGN PATENT DOCUMENTS

| | | |
|---|---|---|
| WO | 03032707 | 4/2003 |
| WO | 2007050185 | 5/2007 |

OTHER PUBLICATIONS

European Search Report, received Jan. 25, 2012 (10 pages).

* cited by examiner

*Primary Examiner* — Christopher J. Novosad
(74) *Attorney, Agent, or Firm* — Klintworth & Rozenblat IP LLC (57) ABSTRACT

A trench opener/closer is provided for an agricultural seeding machine movable in a planting direction. The trench opener/closer includes a disc opener assembly, a gauge wheel assembly, a closing assembly, a boot member, and a seed delivery member. The disc opener assembly has a first axis of rotation. The gauge wheel assembly has a second axis of rotation disposed rearward of the first axis of rotation in the planting direction. The closing assembly has a third axis of rotation disposed rearward of the second axis of rotation in the planting direction. The boot member extends between the disc opener assembly and the closing assembly. The seed delivery member is disposed rearward of the disc opener assembly in the planting direction. The seed delivery member is disposed adjacent to both a trailing edge of the boot member and the closing assembly.

20 Claims, 7 Drawing Sheets

QUICK CLOSING TRENCH OPENER/CLOSER FOR AN AGRICULTURAL SEEDING MACHINE

FIELD OF THE INVENTION

The present invention relates to agricultural machines, and, more particularly to trench openers and closers for agricultural seeding machines.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper, insecticide hopper, trench opener/closer, or other equipment.

One type of opener/closer arrangement uses a depth gauge wheel which is placed ahead of the leading edge of a single disc opener assembly including a seed tube on the trailing side of the disc. The wheel provides depth adjustment, cleans the leading face of the disc, and limits soil lifting and throw adjacent the disc. One or more closing wheels trail the disc to move soil and close the trench over the material deposited from the seed tube. Such openers limit soil disturbance, but often a portion of the seed boot or runner operates soil just outside the seed trench which increases soil disturbance, power requirements, wear, and seed placement inconsistencies. The leading side wheel axis is close to the disc hub so the wheel operates forward of the area where the disc exits the soil. Soil lift at the exit point can be a problem, particularly when the operating depth of the disc is increased. If the boot lies outside the trench, tracking problems are also increased.

With a single disc opener arrangement of this type, the closing wheels trail the seed boot a substantial distance. The actual closing of the trench occurs sometime after the deposited seed reaches the bottom of the trench. As a result, the deposited seed has time to bounce from the bottom of the trench, and this may lead to the seed being placed shallower than desired. At times, the deposited seed can actually bounce completely out of the trench and lie on top of the ground. Seeds which lie on top of the ground will not germinate.

There is a need for a trench opener/closer for an agricultural seeding machine, moving at high ground speeds, which more effectively opens a trench, plants seeds within the trench at the appropriate depth, and closes the trench.

SUMMARY OF THE INVENTION

In one embodiment of the invention, a trench opener/closer is provided for an agricultural seeding machine movable in a planting direction. The trench opener/closer includes a disc opener assembly, a gauge wheel assembly, a closing assembly, a boot member, and a seed delivery member. The disc opener assembly has a first axis of rotation. The gauge wheel assembly has a second axis of rotation disposed rearward of the first axis of rotation in the planting direction. The closing assembly has a third axis of rotation disposed rearward of the second axis of rotation in the planting direction. The boot member extends between the disc opener assembly and the closing assembly. The seed delivery member is disposed rearward of the disc opener assembly in the planting direction. The seed delivery member is disposed adjacent to both a trailing edge of the boot member and the closing assembly.

In another embodiment of the invention, an agricultural seeding machine, movable in a planting direction, is provided. The agricultural seeding machine includes a frame, a disc opener assembly, a gauge wheel assembly, a closing assembly, a boot member, and a seed delivery member. The disc opener assembly is carried by the frame and has a first axis of rotation. The gauge wheel assembly is carried by the frame and has a second axis of rotation disposed rearward of the first axis of rotation in the planting direction. The closing assembly is carried by the frame and has a third axis of rotation disposed rearward of the second axis of rotation in the planting direction. The seed delivery member is carried by the frame and is disposed rearward of the disc opener assembly in the planting direction. The boot member is carried by the frame and extends from the disc opener assembly to the seed delivery member. Both the seed delivery member and a trailing edge of the boot member are positioned adjacent to the closing assembly.

In still another embodiment of the invention, a method is provided of planting with an agricultural seeding machine moving in a planting direction. In one step, a disc opener assembly is provided having a first axis of rotation disposed forward of a second axis of rotation of a gauge wheel assembly in the planting direction. In another step, a seed trench is opened in the soil with the disc opener assembly. In an additional step, the seed trench is kept open from the disc opener assembly to a seed delivery member, disposed rearward of the disc opener assembly in the planting direction, using a boot member extending from the disc opener assembly to the seed delivery member. In another step, a seed is deposited in the opened seed trench using the seed delivery member. In an additional step, the seed trench is closed, as soon as the seed is deposited in the opened seed trench, using a closing assembly positioned proximate both a trailing edge of the boot member and the seed delivery member, wherein a third axis of rotation of the closing assembly is disposed rearward of the second axis of rotation in the planting direction.

These and other features, aspects and advantages of the invention will become better understood with reference to the following drawings, description and claims.

DESCRIPTION OF THE PREFERRED EMBODIMENT

Referring now to the drawings, and more particularly to FIGS. 1-7, there is shown an embodiment of an agricultural seeding machine 10 of the present invention. The agricultural seeding machine 10 is movable in a planting direction 11. In the embodiment shown, agricultural seeding machine 10 is in the form of a row crop planter but may also be in the form of a grain drill, etc. FIGS. 1-7 illustrate different views of a single row crop unit 12 of a multi-row planter, with each row crop unit 12 being substantially identical and connected to a common tool bar 14. Only a single row crop unit 12 is shown for simplicity sake.

Row crop unit 12 includes a frame 16 which is attached to tool bar 14 by parallel linkage 18. Tool bar 14 is coupled to a traction unit (not shown), such as an agricultural tractor. For example, tool bar 14 may be coupled to an agricultural tractor using a 3-point hitch assembly. Tool bar 14 may be coupled with transport wheel assemblies, marker arms, etc. which may be of conventional design and not shown for simplicity sake. The transport wheels, in known manner, may provide ground drive to row crop unit 12 through the use of shafts, chains, sprockets, transfer cases, etc.

Frame 16 carries a trench opener/closer 20 which includes a disc opener assembly 22, gauge wheel assembly 24, closing assembly 26, boot member 23, and seed delivery member 25. The frame 16 also carries a seed meter assembly 27 for delivering seed to the delivery member 25 as known in the art, and a packing assembly (not shown) rearward of the closing assembly 26 for packing down the soil disposed in the trench as known in the art.

Disc opener assembly 22 includes a pair of disc opener blades 28 which are positioned at a predetermined acute angle a relative to each other. Each disc opener blade 28 is carried by a corresponding bearing within a bearing housing 30 and is rotatable about a corresponding axis of rotation 32. Each disc opener blade 28 has a leading edge 34 and trailing edge 36 relative to planting direction 11. When inserted into soil, each disc opener blade 28 generally defines a contact line 40 with the soil (neglecting unevenness of the soil).

Gauge wheel assembly 24 includes a pair of gauge wheels 44. Each gauge wheel 44 is positioned generally in line with and immediately adjacent to the outside of each respective disc opener blade 28 of disc opener assembly 22. Gauge wheel assembly 24 is pivotally coupled with frame 16 by respective arms 46 and is coupled to the disc opener assembly 22 and vertically adjustable to adjust the vertical position of the disc opener assembly relative to the soil. In such manner, the gauge wheel assembly 24 may be used to adjust the depth of the trench which is cut into the soil using the disc opener assembly 22. Each gauge wheel 44 of the gauge wheel assembly 24 is rotatable about a corresponding axis of rotation 48 which is positioned rearward of an axis of rotation 32 of an adjacent disc opener blade 28 of the disc opener assembly 22 relative to the planting direction 11. The leading edge 34 of each disc opener blade 28 is disposed forward of each gauge wheel 44 relative to the planting direction 11. The trailing edge 36 of each disc opener blade 28 is disposed between the gauge wheels 44 with the gauge wheels 44 overlapping the trailing edge 36 relative to the planting direction 11. A portion 45 of each gauge wheel 44 is disposed near or against a portion 47 of each disc opener blade 28 with the gauge wheels 44 overlapping the portion 47 of each disc opener blade 28 relative to the planting direction 11. This configuration allows the portion 45 of each gauge wheel to remove soil from the portion 47 of each disc opener blade 28. Each gauge wheel 44 overlies and defines a gauge wheel contact patch 50 with the soil. The overlap between disc opener blade 28 and the corresponding gauge wheel 44 is such that gauge wheel 44 covers bearing housing 30. The contact line 40 of each disc opener blade 28 is positioned forward and below the contact patch 50 of each of the gauge wheels 44 relative to the planting direction 11.

Closing assembly 26 includes a pair of closing discs 52 which close the seed trench. In other embodiments, the closing assembly 26 may comprise a pair of closing wheels as shown in U.S. Pat. No. 7,438,006 which is hereby incorporated by reference. Each closing disc 52 is positioned rearward of the disc opener blades 28 and the gauge wheels 44. Each closing disc 52 is rotatable about a corresponding axis of rotation 54 which is positioned rearward of both the axis of rotation 32 of the disc opener blades 28 and the axis of rotation 48 of the gauge wheels 44 in the planting direction 11.

Closing assembly 26 is vertically adjustable for adjusting a vertical position of the closing assembly 26 relative to the soil. The closing assembly 26 is pivotally coupled with frame 16 by a down pressure adjustment system 58. The down pressure adjustment system 58 may be configured as a pivot mechanism. The amount of down pressure which is applied to the soil adjacent to the seed trench may be adjusted depending on the application. For example, it may be necessary in certain applications (e.g., no till planting conditions) to apply a higher pressing force to the soil using closing discs 52 in order to effect adequate covering of the seed trench.

Boot member 23 extends between the disc opener assembly 22 and the closing assembly 26. A leading edge 59 of the boot member 23, relative to the planting direction 11, is disposed against and between the disc opener blades 28 between the gauge wheels 44. A trailing edge 61 of the boot member 23, relative to the planting direction 11, is disposed adjacent to, against, and coupled to, the seed delivery member 25. In such manner, the boot member 23 extends from the disc opener assembly 22 to the seed delivery member 25. The seed delivery member 25 is disposed rearward of the disc opener assembly 22 in the planting direction 11. The seed delivery member 25 comprises a seed tube for depositing seed into a trench opened in the soil by the disc opener blades 28. The seed delivery member 25 receives a selected seed type from a seed supply (not shown), such as a seed hopper, being discharged from a seed metering system 27, and directs the seed at a predetermined rate and spacing into the seed trench. Seed delivery member 25 has a width in a direction transverse to the seed trench which is less than the width of the seed trench, but may also be approximately equal to the width of the seed trench.

A bottom portion 63 of the boot member 23 is configured to keep a seed soil trench, opened by the disc opener blades 28, open from when the disc opener blades 28 open the seed soil trench until the seed delivery member 25 delivers seed within the seed soil trench. The bottom portion 63 of the boot member 23 may have an angled shape, a V shape, or a U shape. Both the seed delivery member 25 and the trailing edge 61 of the boot member 23 are disposed between the closing discs 52. The closing discs 52 overlap both the seed delivery member 25 and the trailing edge 61 of the boot member 23 relative to the planting direction 11. The trailing edge 61 of the boot member 23 and the end 65 of the seed delivery member 25, which is coupled to the trailing edge 61 of the boot member 23, are both disposed adjacent to and between the closing discs 52. The closing discs 52 are positioned at a predetermined acute angle a1 relative to each other. The closing discs 52 are positioned proximate the trailing edge 61 of the boot member 23 to allow the closing discs 52 to close the seed soil trench, opened by the disc opener blades 28, as soon as the seed delivery member 25 deposits seed in the seed soil trench.

The closing discs 52 close the seed soil trench by collapsing the soil adjacent to the seed trench resulting in covering of the seed trench.

Figure 1:
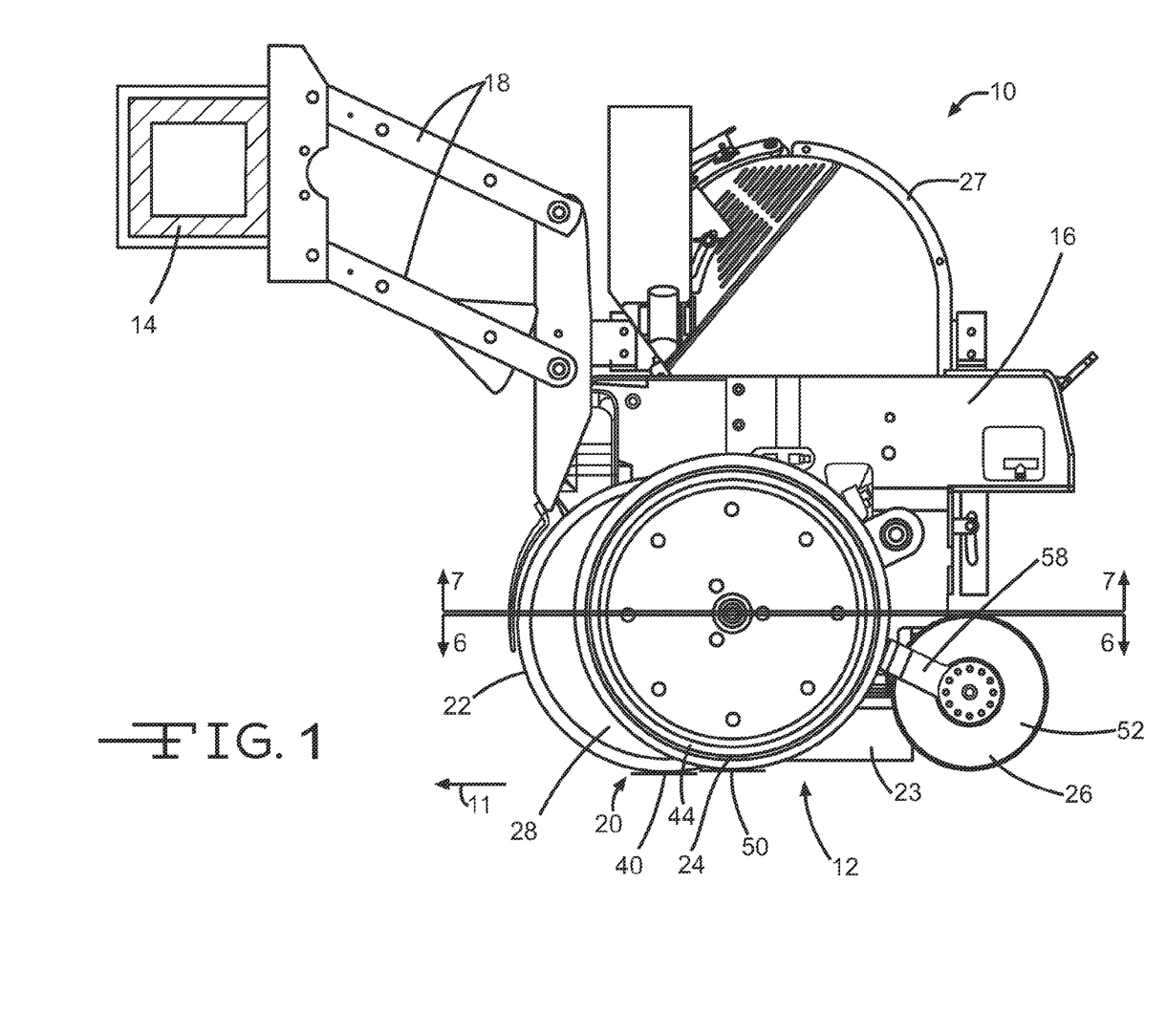
FIG. 1 is a side view of, under one embodiment of the invention, a row crop unit of an agricultural seeding machine.
Figure 2:
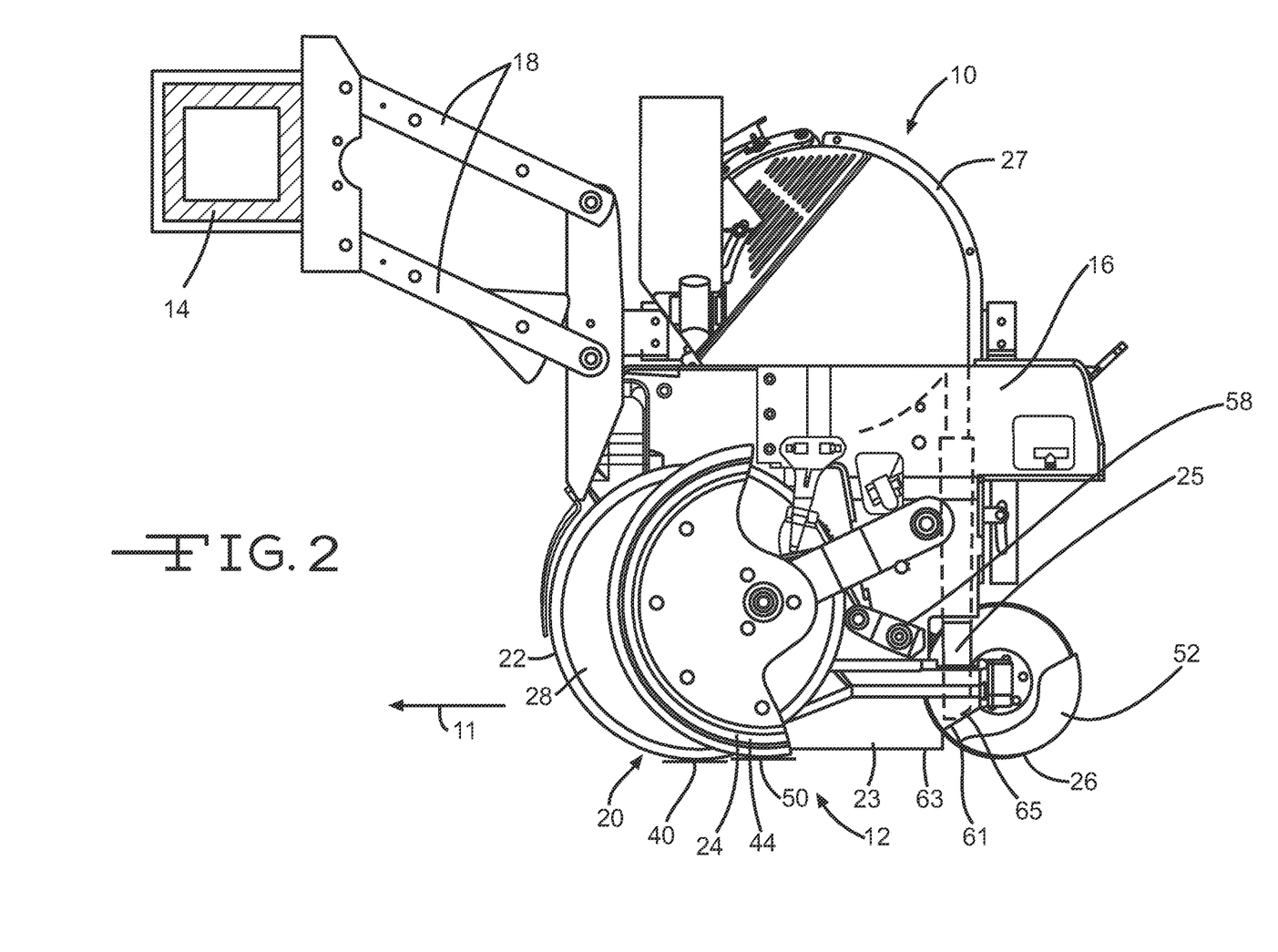
FIG. 2 is a side view of the row crop unit of FIG. 1 with part of a gauge wheel and a closing wheel removed in order to illustrate the position of a seed delivery member.
Figures 3, 4:
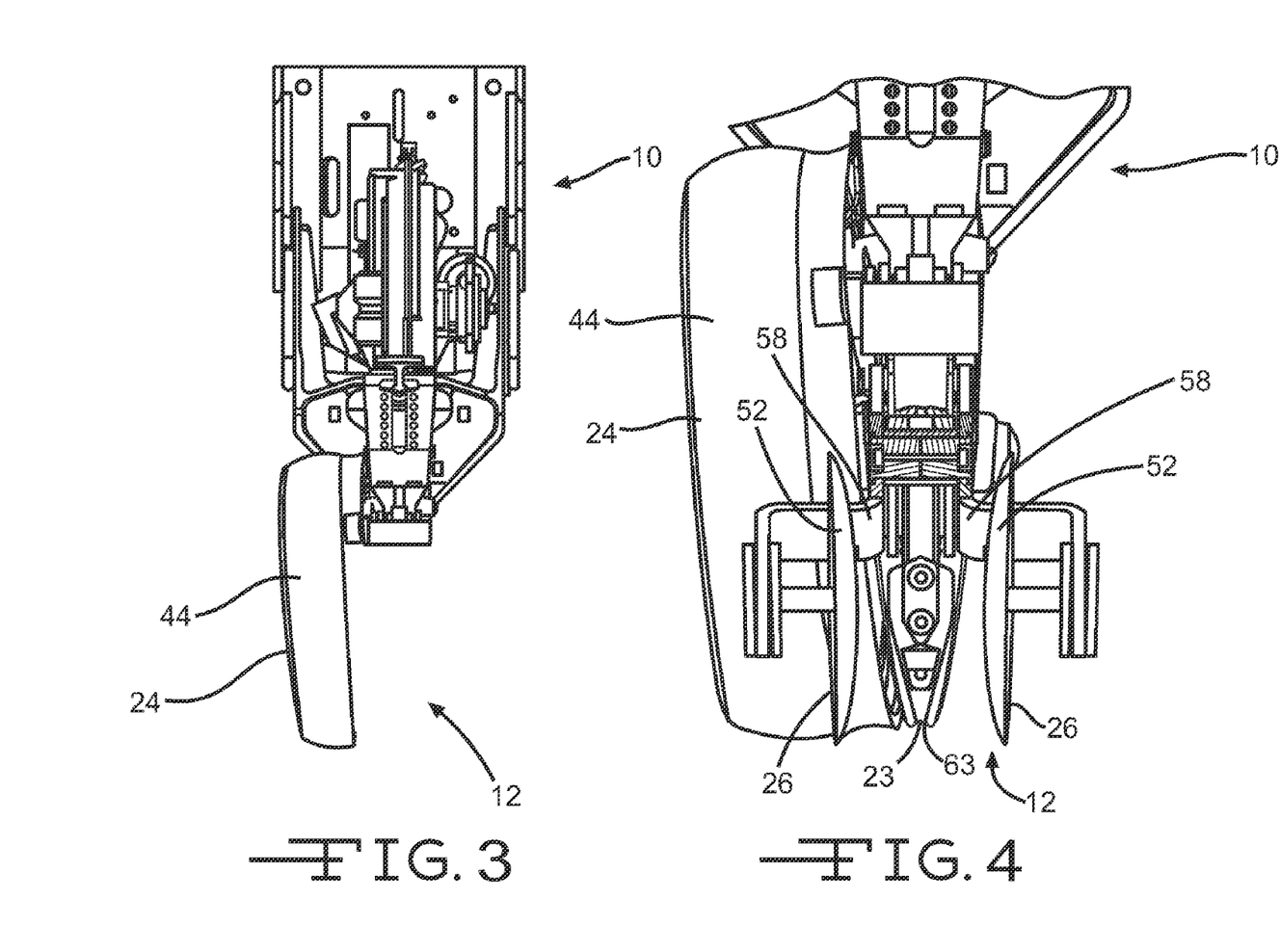
FIG. 3 is a partial back view of the row crop unit of FIG. 1 with one of the gauge wheels removed.
FIG. 4 is a partial front view of the row crop unit of FIG. 1 with one of the gauge wheels removed.
Figure 5:
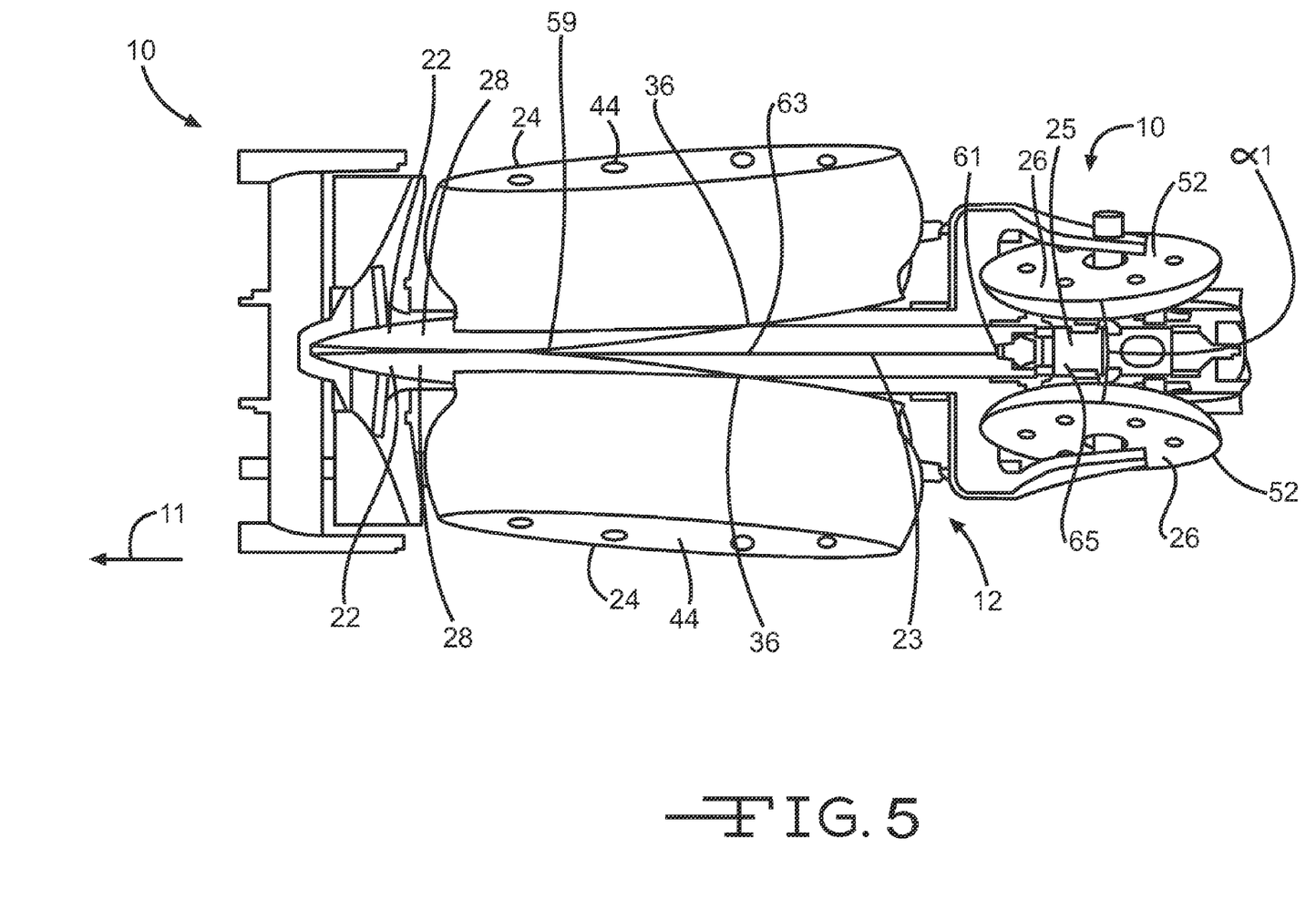
FIG. 5 is a bottom view of the row crop unit of FIG. 1.
Figure 6:
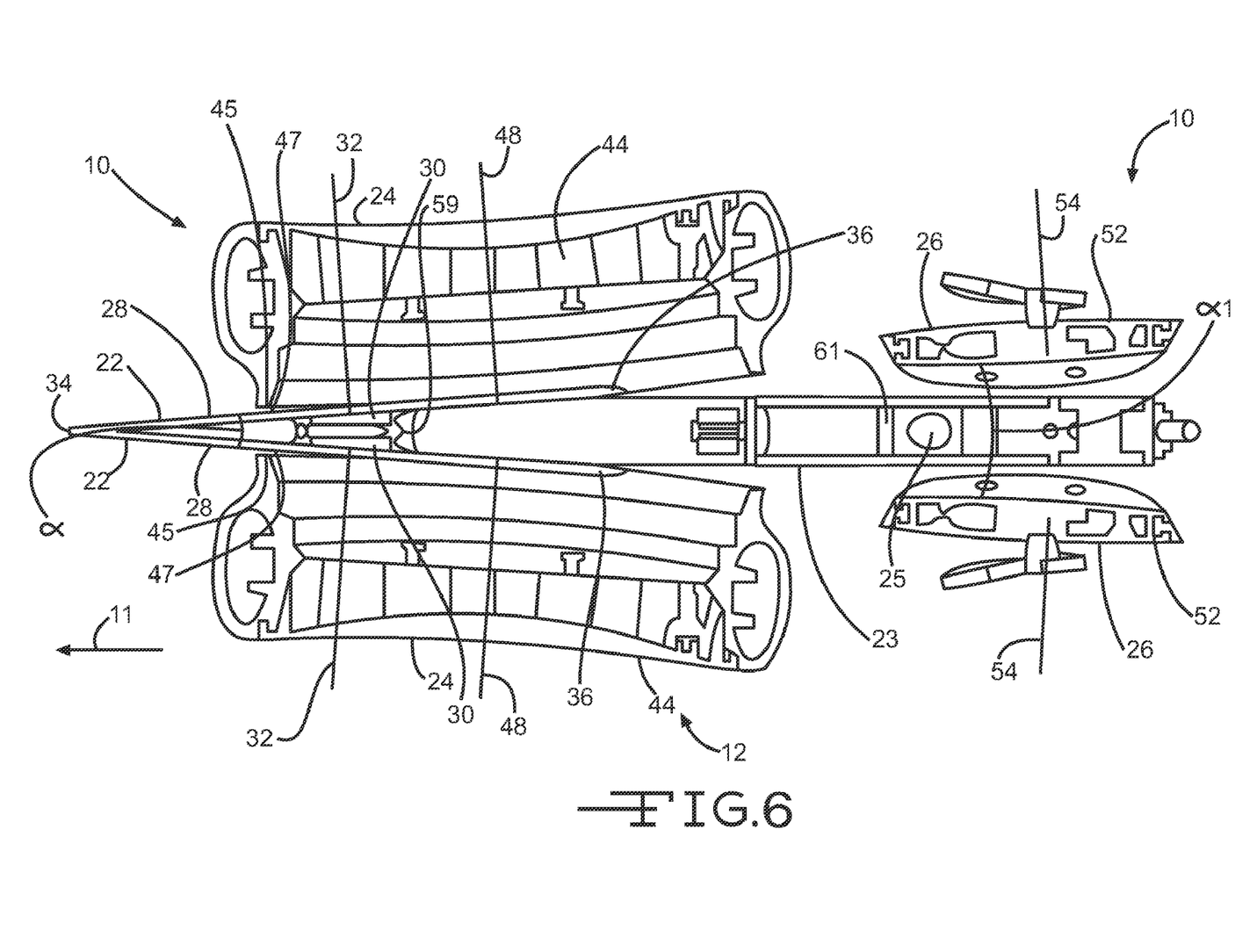
FIG. 6 is a cross-sectional top view of the row crop unit of FIG. 1 along line 6-6.
Figure 7:
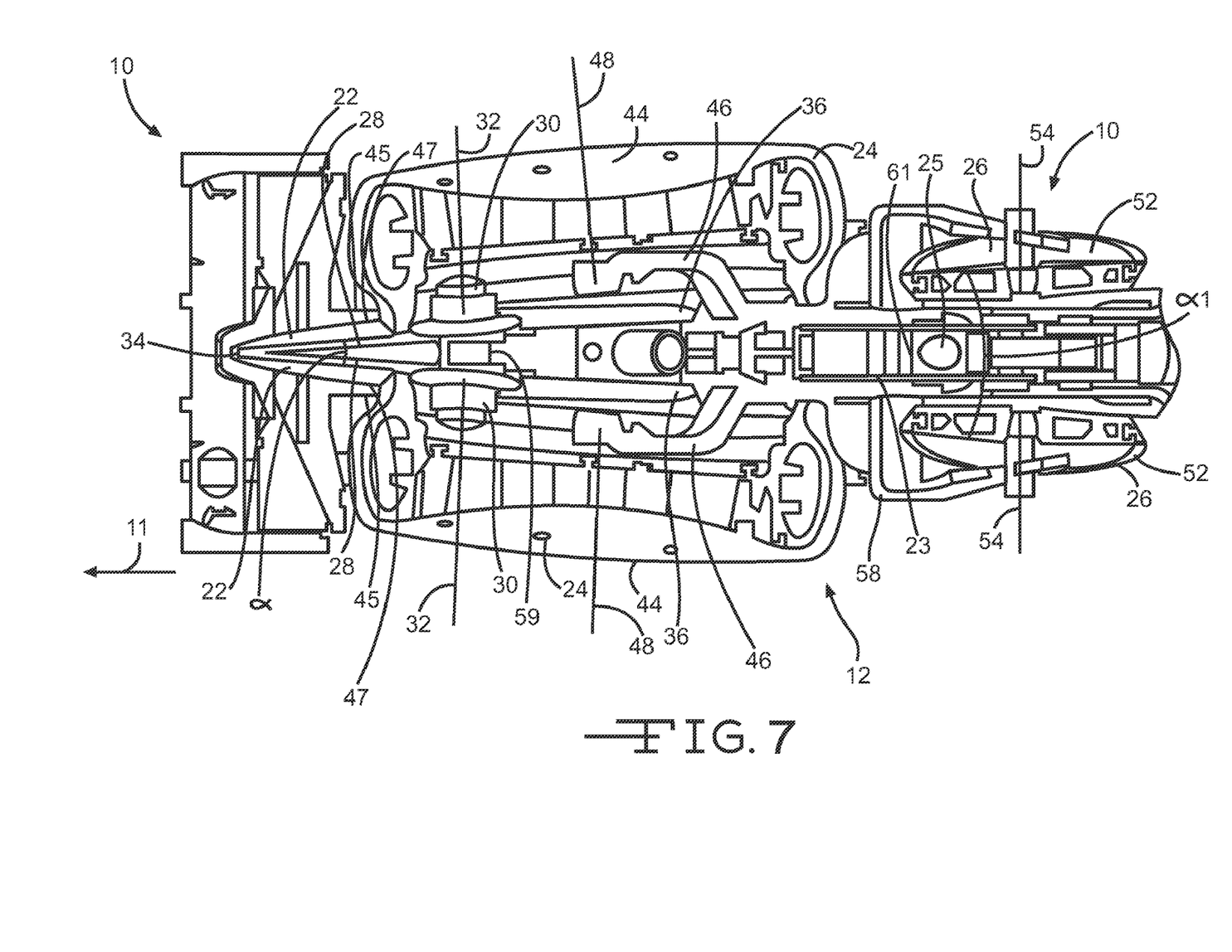
FIG. 7 is a cross-sectional bottom view of the row crop unit of FIG. 1 along line 7-7.
Figure 8:
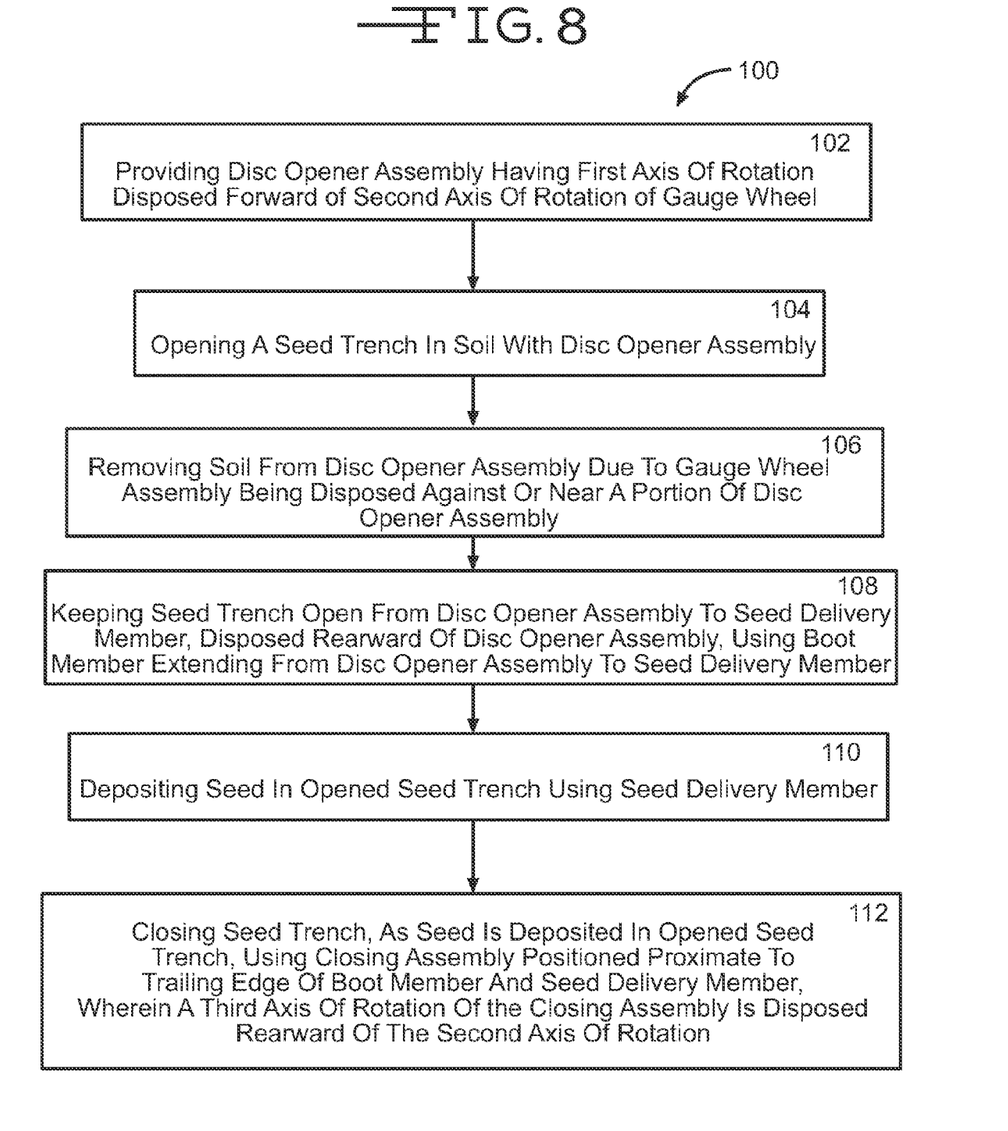
FIG. 8 is a flowchart illustrating one embodiment of a method of the invention of planting with an agricultural seeding machine moving in a planting direction.

FIG. 8 is a flowchart illustrating one embodiment of a method 100 under the invention of planting with an agricultural seeding machine moving in a planting direction. In step 102, a disc opener assembly is provided having a first axis of rotation disposed forward of a second axis of rotation of a gauge wheel assembly in the planting direction. In step 104, a seed trench is opened in the soil with the disc opener assembly. In step 106, soil is removed from the disc opener assembly using the gauge wheel assembly as a result of the gauge wheel assembly being disposed near or against a portion of the disc opener assembly. In step 108, the seed trench is kept open from the disc opener assembly to a seed delivery member, disposed rearward of said disc opener assembly in said planting direction, using a boot member extending from the disc opener assembly to the seed delivery member. In step 110, a seed is deposited in the opened seed trench using the seed delivery member. In step 112, the seed trench is closed, as soon as the seed is deposited in the opened seed trench, using a closing assembly positioned proximate to both a trailing edge of the boot member and the seed delivery member, wherein a third axis of rotation of the closing assembly is disposed rearward of said second axis of rotation in said planting direction.

Trench opener/closer 20 of the invention may be used at higher ground speeds (e.g., greater than 5 mph) with the same or improved spacing accuracy between seeds. The configuration of the gauge wheels 44 relative to the disc opener blades 28 allows the depth of the trench being opened by the disc opener blades 28 to be controlled, while allowing soil to be removed from the disc opener blades 28 as the disc opener blades 28 are opening the trench. This assists in keeping the soil trench open. The configuration of the boot member 23 keeps the soil trench, opened by the disc opener blades 28, open between the disc opener blades 28 and the closing discs 52. This allows the closings discs 52 to be positioned rearward of the disc opener blades 28 and the gauge wheels 44. The position of the closing discs 52 helps control how long the trench stays open and facilitates good seed spacing at higher vehicle speeds. The configuration of the closing discs 52 relative to the boot member 23 and the seed delivery member 25 allows the closing of the seed trench as soon as the seed falls into the seed trench. The overall configuration of the trench opener/closer 20 allows different types of soil packing systems to be used.

Having described the preferred embodiment, it will become apparent that various modifications can be made without departing from the scope of the invention as defined in the accompanying claims.

The invention claimed is:

1. A trench opener/closer for an agricultural seeding machine movable in a planting direction comprising:
   a disc opener assembly having a first axis of rotation;
   a gauge wheel assembly having a second axis of rotation disposed rearward of said first axis of rotation in said planting direction;
   a closing assembly having a third axis of rotation disposed rearward of said second axis of rotation in said planting direction;
   a boot member extending from the disc opener assembly to the closing assembly; and
   a seed delivery member disposed rearward of said disc opener assembly in said planting direction, the seed delivery member disposed adjacent to both a trailing edge of said boot member and the closing assembly.

2. The trench opener/closer of claim 1 wherein the disc opener assembly comprises a pair of disc opener blades.

3. The trench opener/closer of claim 1 wherein the gauge wheel assembly comprises two gauge wheels.

4. The trench opener/closer of claim 1 wherein said gauge wheel assembly is coupled to said disc opener assembly, and said gauge wheel assembly is vertically adjustable for adjusting a vertical position of the disc opener assembly relative to soil.

5. The trench opener/closer of claim 1 wherein said gauge wheel assembly is disposed adjacent or against a portion of said disc opener assembly, with the gauge wheel assembly overlapping the portion of said disc opener assembly relative to said planting direction, for removing soil from the disc opener assembly.

6. The trench opener/closer of claim 1 wherein said disc opener assembly includes a bearing housing, said gauge wheel assembly overlapping said bearing housing relative to said planting direction.

7. The trench opener/closer of claim 1 wherein said disc opener assembly defines a contact line with soil, and said gauge wheel assembly defines a gauge wheel contact patch with the soil, wherein said contact line is positioned forward and below said contact patch relative to said planting direction.

8. The trench opener/closer of claim 1 wherein said closing assembly is vertically adjustable for adjusting a vertical position of the closing assembly relative to soil.

9. The trench opener/closer of claim 1 wherein said closing assembly comprises two closing discs or two closing wheels.

10. The trench opener/closer of claim 1 wherein a bottom portion of said boot member is configured to keep a seed soil trench open from the disc opener assembly to the seed delivery member.

11. The trench opener/closer of claim 10 wherein the closing assembly is configured to close the seed soil trench as soon as the seed delivery member deposits seed in the seed soil trench.

12. The trench opener/closer of claim 1 wherein a leading edge of said boot member, relative to said planting direction, is disposed within said disc opener assembly and the trailing edge of said boot member, relative to said planting direction, is disposed within said closing assembly.

13. The trench opener/closer of claim 1 wherein the seed delivery member comprises a seed tube.

14. The trench opener/closer of claim 1 wherein the seed delivery member is coupled to the trailing edge of the boot member.

15. The trench opener/closer of claim 1 wherein the seed delivery member is disposed between two closing discs or two closing wheels of the closing assembly.

16. The trench opener/closer of claim 1 wherein the boot member extends from the disc opener assembly to the seed delivery member.

17. The trench opener/closer of claim 1 further comprising a frame carrying said disc opener assembly, said gauge wheel assembly, said closing assembly, said boot member, and said seed delivery member.

18. An agricultural seeding machine movable in a planting direction comprising:
   a frame;
   a disc opener assembly, carried by said frame, having a first axis of rotation;
   a gauge wheel assembly, carried by said frame, having a second axis of rotation disposed rearward of said first axis of rotation in said planting direction;

a closing assembly, carried by said frame, having a third axis of rotation disposed rearward of said second axis of rotation in said planting direction;

a seed delivery member, carried by said frame, disposed rearward of said disc opener assembly in said planting direction; and a boot member, carried by said frame, extending from the disc opener assembly to the closing assembly, wherein both the seed delivery member and a trailing edge of the boot member are positioned adjacent to the closing assembly.

19. A method of planting with an agricultural seeding machine moving in a planting direction comprising:

providing a disc opener assembly having a first axis of rotation disposed forward of a second axis of rotation of a gauge wheel assembly in said planting direction;

opening a seed trench in the soil with the disc opener assembly;

keeping the seed trench open from the disc opener assembly to a seed delivery member, disposed rearward of said disc opener assembly in said planting direction, using a boot member extending from the disc opener assembly to the closing assembly;

depositing a seed in the opened seed trench using the seed delivery member; and closing the seed trench, as soon as the seed is deposited in the opened seed trench, using a closing assembly positioned proximate both a trailing edge of the boot member and the seed delivery member, wherein a third axis of rotation of the closing assembly is disposed rearward of said second axis of rotation in said planting direction.

20. The method of claim 19 further comprising removing the soil from the disc opener assembly using the gauge wheel assembly.

* * * * *